United States Patent [19]
Coackley

[11] 3,787,763
[45] Jan. 22, 1974

[54] APPARATUS FOR MEASURING CONVERSION OF AMPLITUDE MODULATION TO PHASE MODULATION

[75] Inventor: Robert Coackley, Dalgety Bay, Scotland

[73] Assignee: Hewlett-Packard Ltd., South Queensferry, West Lothian, Scotland

[22] Filed: Aug. 24, 1972

[21] Appl. No.: 283,602

[30] Foreign Application Priority Data
Oct. 13, 1971 Great Britain.................. 47,552/71

[52] U.S. Cl............................................... 324/57 R
[51] Int. Cl.............................................. G01r 27/00
[58] Field of Search................................... 324/57 R

[56] References Cited
UNITED STATES PATENTS
2,416,310  2/1947  Hansen et al. ................ 324/57 R X
3,119,062  1/1964  Codd................................ 324/57 R FOREIGN PATENTS OR APPLICATIONS
158,739  3/1964  U.S.S.R............................... 324/57
206,650  6/1968  U.S.S.R............................... 324/57

Primary Examiner—Stanley T. Krawczewicz
Attorney, Agent, or Firm—A. C. Smith

[57] ABSTRACT

This apparatus measures conversion of amplitude modulation to phase modulation and is useful where resultant unwanted phase modulation is to be measured, but is mainly intended for testing devices used in 70 MHz frequency modulated communications systems where, for example, the amplitude modulation to phase modulation conversion of limiters and other devices cause distortion of the desired frequency modulated signal.

8 Claims, 1 Drawing Figure

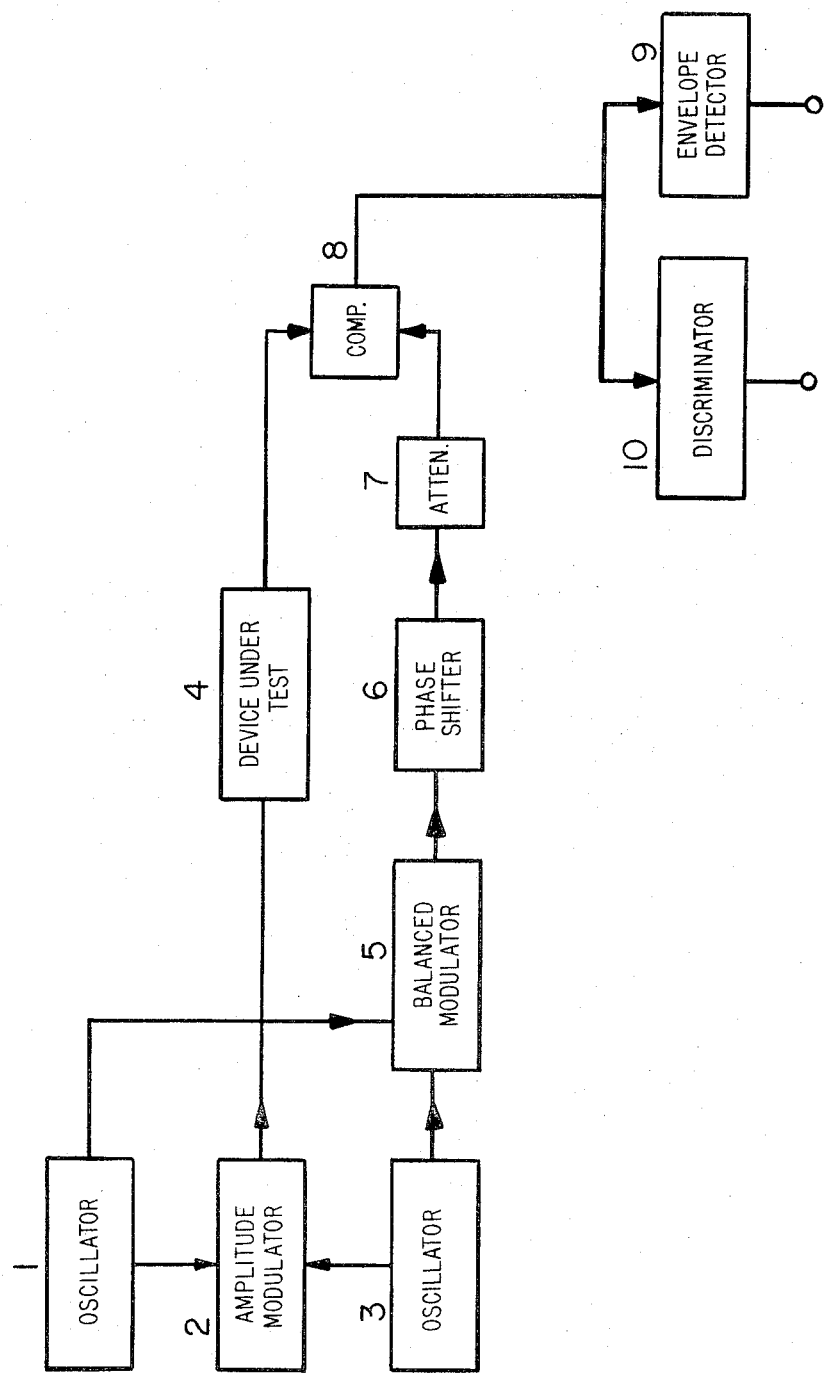

APPARATUS FOR MEASURING CONVERSION OF AMPLITUDE MODULATION TO PHASE MODULATION

BACKGROUND OF THE INVENTION

There have been several methods of measuring conversion of amplitude modulation to phase modulation, the most successful of which are only useful in the laboratory with a considerable amount of expensive test equipment. This is particularly true of the so called "spectrum method" where a signal which is phase modulated in the opposite sense to that produced from the converted amplitude modulation is introduced simultaneously to equalize and/or minimize the side band amplitudes as measured on a spectrum analyzer. The synthesized phase modulated signal is then indicative of the unwanted phase modulation generated by conversion in the device under test.

Other methods are restricted to the measurement of conversion occurring in limiters since the removal of amplitude modulation is a requirement for the correct measurement, such as the method described by G.R.J. Baldwin, in "The Marconi Review," third quarter 1966, under the title "A Direct Method of Measuring AM to PM Conversion in Limiting Amplifiers under Dynamic Conditions."

SUMMARY OF THE INVENTION

According to the present invention there is provided apparatus for measuring the conversion of amplitude modulation to phase modulation caused by a device under test, including a means for generating a carrier frequency, a means for generating a modulating frequency, a modulating means having its inputs connected to said frequency generators and having its output connected to supply a predetermined known amplitude-modulated signal to the device under test which forms part of a test path, phase shifting means forming part of a reference path which also includes means for amplitude modification, the amplitude modification and the phase shifting being independent from each other, comparing means having its input connected to the output of said test path and to the output of said reference path, an envelope detector connected to said comparing means to indicate the degree of nulling out achieved by adjustment of the phase shifting and amplitude modifying means, and a discriminating means having a known frequency to voltage conversion slope connected to said comparing means.

DESCRIPTION OF THE DRAWING AND PREFERRED EMBODIMENT

An embodiment of the present invention will now be described by way of example, with reference to the accompanying drawing, which illustrates the embodiment in diagrammatic form.

An oscillator 1 is connected to supply a carrier frequency signal to high guality amplitude modulator 2, which is also supplied by a modulating frequency signal from a second oscillator 3. The modulator 2 is connected to the input of a device under test 4. The same oscillators 1 and 3 are also connected to a balanced modulator 5 which in turn is connected to a phase shifter 6 forming part of a reference path which also includes an attenuator 7.

The outputs of the test path, which includes the device under test, and the reference path are supplied to an adder or comparator 8 which in turn is connected to an envelope detector 9 and to a discriminator 10.

In operation, the amplitude modulator 2 delivers a predetermined known amplitude-modulated test signal to the device under test 4 which signal has virtually no frequency modulated component and practically only comprises the carrier frequency and two side bands. The oscillators 1 and 3 simultaneously supply the balanced modulator 5 with the same carrier and modulating frequencies so that said modulator produces amplitude modulation side bands with a suppressed carrier signal. This signal is phase shifted and amplitude modified by the components 6 and 7 and is then supplied to the adder 8 together with the output from the device under test. The phase and the amplitude of the output signal of the reference path are adjusted independently from each other, such that the side band components are substantially nulled out as indicated by the envelope detector 9 which shows a minimum amplitude modulation. However, because of the non-linearities of the device under test there will remain a certain degree of phase modulation which can be measured directly in amplitude using the conventional discriminator 10 with its known frequency to voltage slope, since the carrier, not having been nulled out, is still of large amplitude. This provides a low noise high resolution measurement where only phase and amplitude adjustments need be made.

The discriminator 10 may comprise a limiter to remove small errors due to any remaining amplitude modulation since at this point the resultant conversion of amplitude modulation to phase modulation can be neglected without introducing an undue error into the measurement.

It will be evident to those skilled in the art, that the described circuitry can be modified, for example, the adder may be replaced by a substractor depending on the phase of the reference signal as modified by the phase shifter 6. This phase shifter should preferably have a phase shifting range from 0° to 360°. If the device under test has a substantial delay, it can then become necessary to provide for a delay means in the reference channel.

Of course, the attenuation range of the attenuator 7 should be matched to the dynamic characteristics of the output signal of the device under test. If this device under test is an active device having a gain greater than unity there should be also provided an attenuator in the test path or a respective gain amplifier in the reference path.

As a practical matter to increase the versatility of the instrument several of the mentioned components may be plug-in units.

1. Apparatus for measuring the conversion of amplitude modulation to phase modulation caused by a device under test, including a means for generating a carrier frequency, a means for generating a modulating frequency, a modulating means having its inputs connected to said frequency generators and having its output connected to supply a predetermined known amplitude-modulated signal to the device under test which forms part of a test path, phase shifting means forming part of a reference path which also includes means for amplitude modification, the amplitude modification and the phase shifting being independent from each other, comparing means having its input connected to the output of said test path and to the output of said reference path, an envelope detector connected to said comparing means to indicate the degree of nulling out achieved by adjustment of the phase shifting and amplitude modifying means, and a discriminating means having a known frequency to voltage conversion slope connected to said comparing means.

2. Apparatus according to claim 1, wherein said reference path comprises a balanced modulating means the inputs whereof are connected to said means for generating carrier and modulating frequencies, the output whereof supplying a signal with amplitude modulation side band frequencies but substantially without a carrier frequency component.

3. Apparatus according to claim 1 wherein said phase shifting means has a phase shifting range from 0° to 360°.

4. Apparatus according to claim 1 wherein said amplitude modifying means is an attenuator.

5. Apparatus according to claim 4, wherein said attenuator has an attenuation range from zero to infinite attentuation.

6. Apparatus according to claim 1 wherein said test path further comprises an attentuation means to facilitate testing of a device having a gain greater than unity.

7. Apparatus according to claim 1 wherein said discriminating means comprises an amplitude limiting means to suppress remaining amplitude modulation.

8. Apparatus according to claim 1 wherein said reference path also comprises a delay means.

* * * * *